a2 United States Patent
Salsbury et al.

(10) Patent No.: US 7,024,254 B2
(45) Date of Patent: Apr. 4, 2006

(54) METHOD FOR CONTROLLING A DISCRETE SYSTEM

(75) Inventors: Timothy I. Salsbury, Milwaukee, WI (US); Kirk H. Drees, Cedarburg, WI (US); Bin Chen, St. Francis, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 72 days.

(21) Appl. No.: 10/815,100

(22) Filed: Mar. 31, 2004

(65) Prior Publication Data

US 2004/0215356 A1   Oct. 28, 2004

Related U.S. Application Data

(63) Continuation-in-part of application No. 10/075,177, filed on Feb. 14, 2002, now abandoned.

(51) Int. Cl.
G05B 13/02 (2006.01)
(52) U.S. Cl. .............................. 700/55; 700/14; 700/45; 700/72; 700/277; 700/296; 700/306; 702/89; 702/176; 702/190; 702/199; 307/141; 236/46
(58) Field of Classification Search ................ 700/14, 700/28, 33, 37, 40–45, 54, 55, 71–73, 276–278, 700/296, 299, 306; 702/89, 99, 130, 176, 702/189–191, 194, 199; 307/112, 116, 141; 236/46, 78, 79; 381/561; 62/157, 158; 219/490, 219/492; 318/561
See application file for complete search history.

(56) References Cited

U.S. PATENT DOCUMENTS

| 4,196,356 A | * | 4/1980 | Kabat .......................... 307/117 |
| 4,349,868 A | * | 9/1982 | Brown ......................... 700/37 |
| 4,901,918 A | | 2/1990 | Grald et al. ................ 236/178 |
| 5,276,630 A | | 1/1994 | Baldwin et al. ............. 364/505 |
| 5,392,456 A | * | 2/1995 | Mitomo et al. ......... 340/825.21 |
| 5,558,274 A | | 9/1996 | Ben-Aissa et al. ............. 236/13 |
| 5,607,190 A | | 3/1997 | Exandier et al. .............. 285/93 |

(Continued)

FOREIGN PATENT DOCUMENTS

JP 06266411 A * 9/1994

(Continued)

OTHER PUBLICATIONS

Al-Numay, S., D. G. Taylor, "One Cycle Averaging for Digital PWM Control System Design", Proceedings of the American Control Conference Jun. 2000, p. 1057.

(Continued)

*Primary Examiner*—Anthony Knight
*Assistant Examiner*—Crystal J Barnes
(74) *Attorney, Agent, or Firm*—Foley & Lardner LLP

(57) ABSTRACT

A system and method for controlling a controlled parameter that affects a target parameter of a target zone is disclosed. The method comprises providing a feedback control loop having a switching controller, a controlled device, and an averaging device. The controlled device comprises a time constant and a specified operational characteristic. The controlled device comprises a first operational state and a second operational state. The method further comprises calculating a time constant for the averaging device based at least on the time constant for the controlled device, and the specified operational characteristic. The specified operational characteristic may comprises a minimum amount of time that the controlled device operates before it can be switched between the first operational state and the second operational state.

35 Claims, 6 Drawing Sheets

U.S. PATENT DOCUMENTS

| | | | | |
|---|---|---|---|---|
| 5,893,055 | A * | 4/1999 | Chen | 702/189 |
| 6,006,142 | A | 12/1999 | Seem et al. | 700/276 |
| 6,054,903 | A * | 4/2000 | Fiedler | 331/17 |
| 6,122,605 | A | 9/2000 | Drees et al. | 702/194 |
| 6,260,975 | B1 * | 7/2001 | Nagano | 323/209 |
| 6,408,228 | B1 | 6/2002 | Seem et al. | 700/276 |
| 6,424,873 | B1 | 7/2002 | Przybylski | 700/42 |
| 6,522,954 | B1 | 2/2003 | Kummerer et al. | 700/278 |
| 6,554,198 | B1 | 4/2003 | Hull et al. | 236/49.3 |
| 6,687,555 | B1 * | 2/2004 | Honda et al. | 700/73 |
| 2002/0116075 | A1 | 8/2002 | Salsbury | 700/1 |
| 2003/0153986 | A1 | 8/2003 | Salsbury et al. | 700/11 |

FOREIGN PATENT DOCUMENTS

| | | |
|---|---|---|
| JP | 06289909 A * | 10/1994 |

OTHER PUBLICATIONS

Bernelli-Zazzera, F., P. Mantegazza, "Linearization Techniques for Pulse Width Control of Linear Systems", Control and Dynamic Systems: Advances in Theory and Applications, vol. 70, 1995; p. 67.

Clark, R. C., "HVACSIM+ Building Systems and Equipment Simulation Program Reference Manual", Published by the U.S. Department of Commerce, National Bureau of Standards, National Engineering Laboratory, Center for Building Technology, Building Equipment Division, Gaithersburg, MD 20899, 1985.

Energy Information Administration (EJA), "Commercial Building Energy Consumption and Expenditures 1995". DOE/EIA-0625(95), Washington, D.C., 1998.

Guo, B., D. C. Lin, Y. L. Feng, K. G. D. Laknath, M. Syedulaq, M. Nakaoka, "New Conceptual Electromagnetic Induction Fluid Heating System Using Resonant PWM Inverter with Auto-Tuning PID Controller". Proceedings of the IEEE International Conference on Industrial Technology, 1996, p. 390.

Mallinson, N., "Plug & Play Single Chip Controllers for Variable Speed Induction Motor Drives in White Goods and HVAC Systems", Proceedings of the 13th Annual Applied Power Electronics Conference, 1998, p. 756.

Nagai, S., H. Nagura, M. Nakoaka, "High Frequency Inverter with Phase-Shifted PWM and Load Adaptive PFM Control Strategy for Industrial Induction-Heating", Proceedings of IEEE Industry Applications Conference, Canada, 1993, p. 2165.

Seem, J. E., "A New Pattern Recognition Adaptive Controller with Application to HVAC Systems", Automatica, vol. 34, No. 8, 1998, p. 969.

Seem, J. E., C. Park, and J. M. House, "A new sequencing control strategy for Air-Handling Units," International Journal of Heating, Ventilating, Air-Conditioning and Refrigerating Research, vol. 5, No. 1, Jan., 1999, pp. 35-58.

Skoog, R. A., G. L. Blankenship, "Generalized Pulse-Modulated Feedback Systems: Norms, Gains, Lipschitz Constants, and Stability", IEEE Transactions on Automatic Control. vol. AC-21, No. 5, 1976, p. 739.

Sira-Ramirez, H. 1989, "Sliding Regimes in Pulse-Width-Modulation Systems Design", Proceedings of the $28^{th}$ IEEE Conference on Decision and Control-Tampa, Florida, 1989, p. 2199-2204.

Van Varseveld, R., G. Bone, "Accurate Position Control of a Pneumatic Actuator Using On/Off Solenoid Valves", IEEE/ASME Transactions on Mechatronics, vol. 2, 1997, p. 195.

Zaheer-Uddin, M., G. R. Zheng, "A VAV System Model for Simulation of Energy Management Control Functions: Off Normal Operation and Duty Cycling", International Journal of Energy Conversion and Management, 1994, p. 917.

Salsbury, Timothy I., "A New Pulse Modulation Adaptive Controller (PMAC) Applied to HVAC Systems", 43 pgs.

Salsbury, Timothy I. "A New Sequencer Controller for Multistage Systems of Known Relative Capacities", 45 pgs.

AstrOm, K., T. Hagglund, "PID Controllers: Theory, Design, and Tuning", Published by the Instrument Society of America, pp. 78-79, bearing a designation "Copyright ©1995."

Itkis, U., "Control Systems of Variable Structure", Published by John Wiley & Sons, pp. 21-50 and 74-93, bearing a designation "Copyright ©1976."

Nash, J. C., "Compact Numerical Methods for Computers: Linear Algebra and Function Minimization", Published by Adam Hilger, Ltd, Bristol, pp. 161-164, bearing a designation "Copyright ©1979, 1980."

* cited by examiner

Supply Air Temperature (without Filter)

Supply Air Temperature (with Filter)

Temperature in Controlled Space

Pulse Stream

METHOD FOR CONTROLLING A DISCRETE SYSTEM

CROSS-REFERENCE TO RELATED APPLICATIONS

The present invention claims priority under 35 U.S.C. § 120 as a Continuation-in-Part (CIP) from U.S. patent application Ser. No. 10/075,177 titled "FILTERED VARIABLE CONTROL METHOD FOR ACTIVATING AN ELECTRICAL DEVICE" filed Feb. 14, 2002 now abandoned, the full disclosure of which is hereby incorporated herein by reference.

U.S. patent application Ser. No. 10/040,069 titled "Pulse Modulation Adaptive Control Method For Activating An Electrical Device" filed Nov. 7, 2001, is hereby incorporated herein by reference.

FIELD

The present invention relates to facility management systems which control equipment, such as heating, ventilation and air conditioning equipment; and more particularly to a system and method of controlling devices that operate at discrete states.

BACKGROUND

It is known to apply feedback control of a system with one or more on/off devices. An example of a feedback control loop 10 is shown in FIG. 1. Control loop 10 includes a conventional feedback controller 12 that produces an analog control signal u in response to a deviation of the controlled variable y from a desired set-point SP. The control signal u is applied to a switching law 14 (e.g., a pulse width modulation (PWM) controller, or the like) positioned intermediate to the feedback controller 12 and a controlled system 16. (By contrast, for a system that can be modulated, this control signal u is applied directly to a driver for the controlled system 16, which produces the desired change.) The switching law 14 responds to the control signal u by producing a pulsed output signal h (i.e., a sequence, in time, of on and off epochs) that turns the discrete devices of the controlled system 16 on and off.

The controllers for such conventional systems typically operate based on sensing a variable or parameter (i.e., a "controlled variable") associated with the controlled devices. In these systems, however, there is often another variable "downstream" from the controlled variable (i.e., a "downstream variable") that has variations which are more important to the desired operation of the system than the variations in the controlled variable. In situations where the time constant to effect change in the downstream variable is significantly different (e.g., larger) than the time constant for the controlled variable, the controlled variable tends to vary widely each time the devices are switched on or off, even though there is little or no change in the downstream variable. This makes it make it difficult to apply effective feedback control.

An example of such a system is a control loop for a heating, ventilation and air conditioning (HVAC) system. The HVAC system includes ventilation equipment that supplies heated or cooled air to one or more controlled spaces or target zones of a building. To maintain the controlled space at the desired temperature, the thermal output of the HVAC system must be regulated. With many HVAC systems, the ventilation equipment cannot be modulated over a continuous range but instead can only be switched to an "on" or "off" state. There are various types of known control methods that can be used to control these types of discrete systems, a well-known example being pulse width modulation (PWM).

One commonly employed HVAC system that uses such discrete devices is known as a direct expansion ("DX") cooling system. DX cooling systems typically include a feedback controller that operates one or more compressors that can only be switched on or off. In most installations, the on/off switching of the compressors is controlled based on the temperature of the air as it comes off of the DX cooling coil (i.e., the "supply air temperature") because it is typically not feasible to control the system by measuring temperatures in the controlled space. Based on the desired system performance, a set-point (in combination with other inputs or additional heating or cooling sources within the controlled space) is selected to provide the desired temperature of the controlled space. (For example, in a DX cooling system this set-point is typically between about 40° F. and about 65° F.—most typically about 55° F.) The supply air temperature (i.e., measured controlled variable y) is fed back to the feedback controller. The feedback controller compares the supply air temperature to the set-point and issues the control signal u to the controlled devices (e.g., turning the compressors on or off).

In such HVAC systems, the supply air temperature (i.e., the controlled variable) tends to change relatively quickly after the compressors are turned on or off. For example, when a compressor turns on, the supply air coming off the DX coil will cool rapidly; and when a compressor turns off, the air coming off the DX coil will warm rapidly. Such a quickly-reacting control loop tends to cause substantial oscillations in the controlled variable, which get fed back the controller. These wide variations or oscillations make it difficult for a feedback controller to provide stable regulation. Also, the compressors typically cannot be switched on and off too frequently. Such frequent on and off cycling is hard on the components and can lead to premature failure. A control loop having a small time constant relative to the maximum switching frequency of the components tends to make it difficult to apply feedback control.

As is well known in the HVAC field, the temperature in the controlled space (the downstream variable) is more important to the desired operation of the system than the temperature of the air coming off the cooling coil (the controlled variable). Persons located in the controlled space only care about the temperature in their immediate environment; the temperature at the cooling devices at a remote location is not relevant to anyone other than the building operators. Controlling the temperature in the controlled space is complicated by the fact that one cooling unit may serve many spaces, or the time constant of the variable being larger than the time constant for the controlled variable. This is largely due to the substantial volume of air typically found in the controlled space. As a result, the controller may be operating contrary to the desired performance of the system due to the fact that the controlled variable is insufficiently damped to reflect the true variations occurring in the downstream variable.

Although use of the downstream variable in the control scheme could be used to address the problem of insufficient damping, this downstream variable is often unavailable to the cooling device controllers in known HVAC systems. Even if the measurement were available, the existence of multiple controlled spaces and disturbances occurring between the cooling device and the controlled space would make it unreliable. Thus, it would be advantageous to provide an averaged signal (e.g., of a supply air temperature measurement) that has dynamics representative of those associated with the controlled space. It would also be advantageous to pass a supply air temperature measurement through an averaging process that has a time constant comparable to the time constant of the controlled space. It would further be desirable to provide for a control method having one or more of these or other advantageous features.

SUMMARY

The present invention relates to a method for controlling a discrete system that affects a target parameter of a target zone. The method comprises providing a feedback control loop having a switching controller, a controlled device, and an averaging device. The controlled device comprises a time constant and a specified operational characteristic. The controlled device comprises a first operational state and a second operational state. The method further comprises calculating a time constant for the averaging device based at least on the time constant for the controlled device, and the specified operational characteristic.

The present invention relates to a system for controlling a discrete system that affects a target parameter of a target zone. The method comprises a feedback control loop having a switching controller, a controlled device, and an averaging device. The controlled device having a time constant and a specified operational characteristic. The controlled device having a first operational state and a second operational state. The averaging device having a time constant based on the time constant for the controlled device, a controllable range of the controlled device, and the specified operational characteristic.

The present invention further relates to various features and combinations of features shown and described in the disclosed embodiments.

DETAILED DESCRIPTION OF A PREFERRED AND OTHER EXEMPLARY EMBODIMENTS

Figure 8:
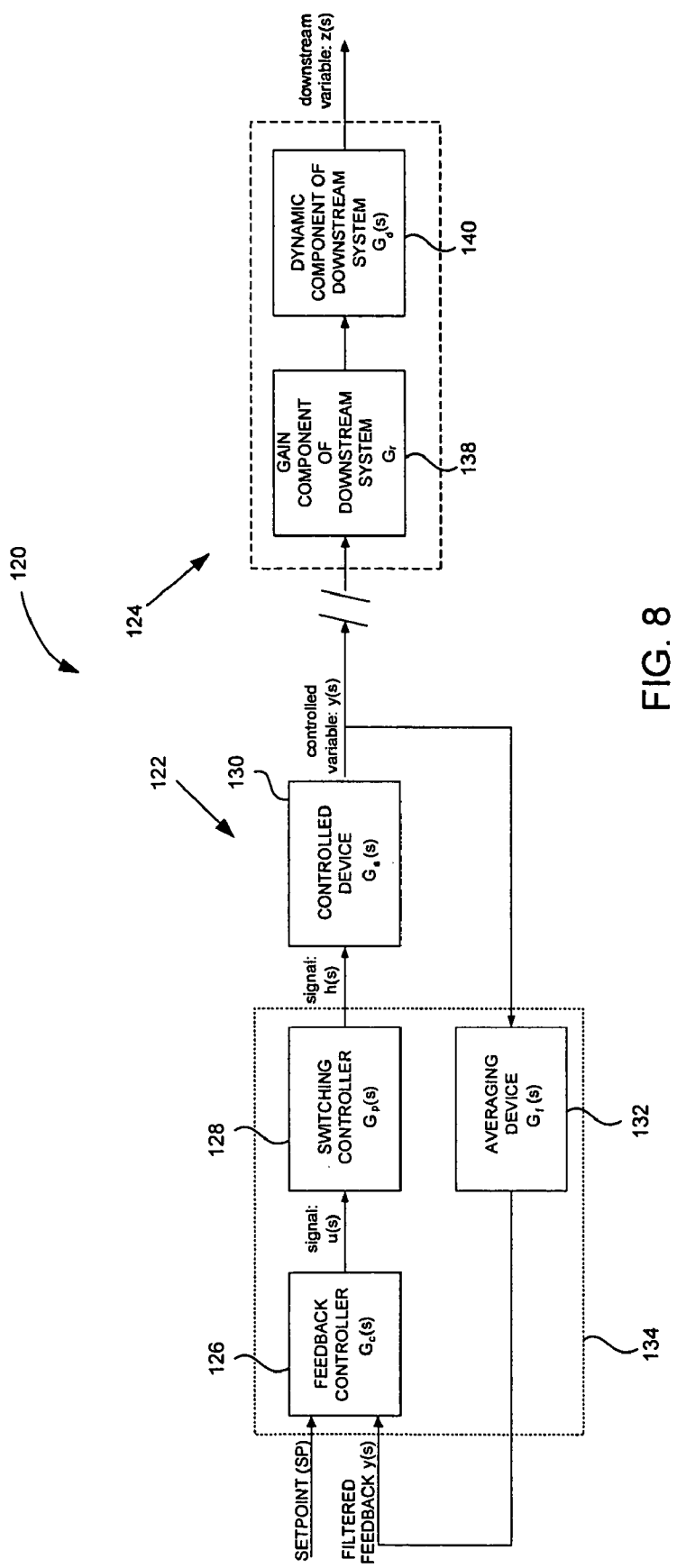
FIG. 8 is a block schematic diagram of one embodiment of a feedback control loop system according to the present invention.
Figure 9:
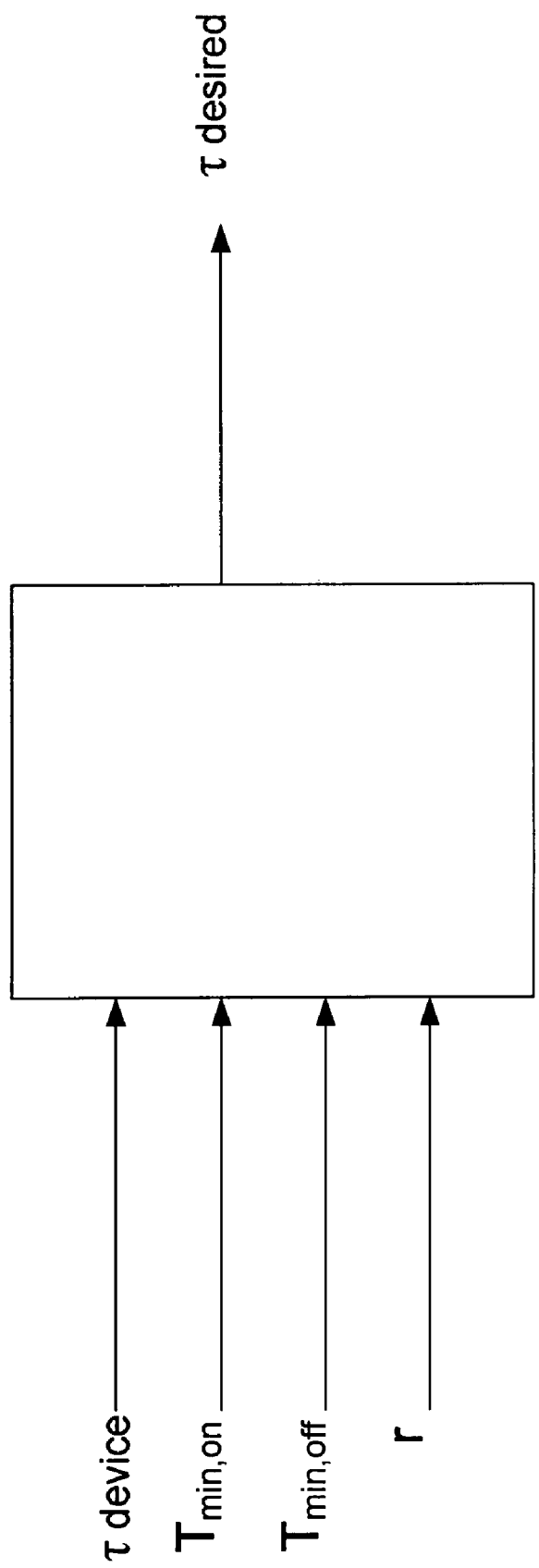
FIG. 9 is a schematic diagram of the potential inputs for the time constant for the averaging device.

FIGS. 1–7 illustrate an embodiment where the time constant of the averaging device (e.g., a filter) is representative of the dominant time constant of the downstream system that the control system is attempting to control. FIGS. 8 and 9 illustrate where the time constant of the averaging device (e.g., a filter) is based on specified operational or performance characteristics of the controlled device (e.g., minimum amount of time that must pass before the controlled device can be switched between states such as minimum on and off times).

Figure 1:
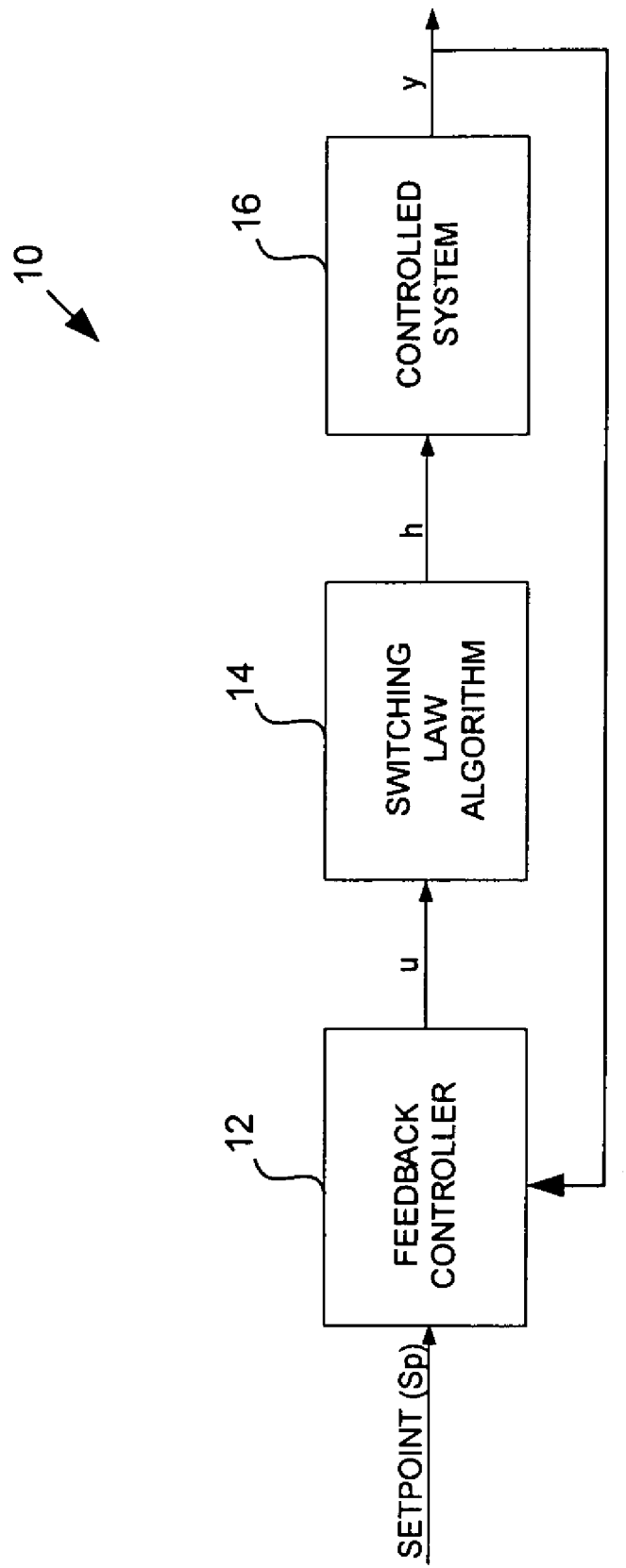
FIG. 1 is a block schematic diagram of a conventional feedback control loop system.
Figure 2:
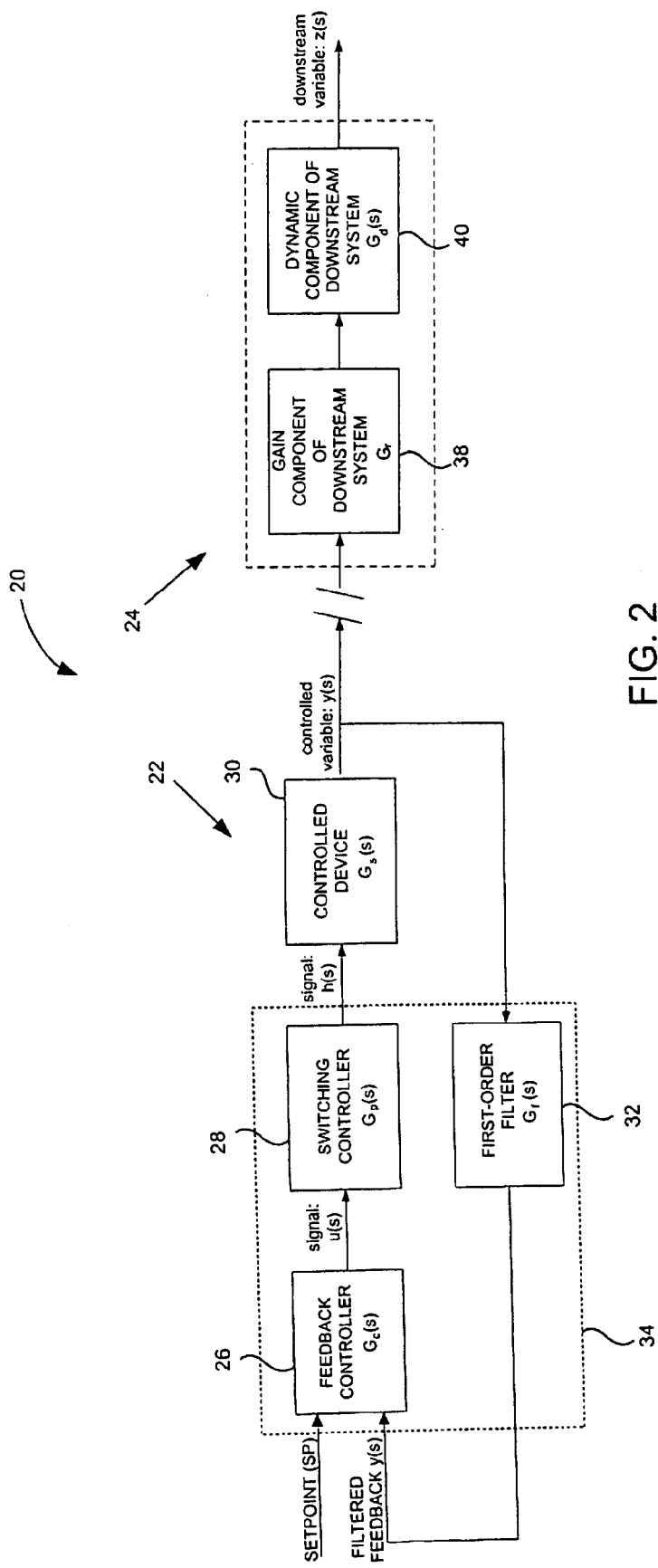
FIG. 2 is a block schematic diagram of an averaged signal control loop system according to one embodiment.

FIG. 2 shows a filtered variable feedback control loop system 20 according to a preferred embodiment. Filtered control system 20 includes a feedback control loop 22 and a downstream (controlled) system 24. Control loop 22 is configured to filter a controlled parameter or variable y(s) according to the dynamics of a downstream variable z(s) for downstream system 24.

Control loop 22 includes a feedback controller 26, a switching law (shown as a switching controller 28 that operates from a switching law algorithm), a controlled system (shown as a controlled device 30), and a filter 32. As explained in detail below, filter 32 is applied to controlled variable y(s) so that controlled device 30 ultimately responds more appropriately to the slower-reacting downstream variable z(s). According to a preferred embodiment, feedback controller 26, switching controller 28, and filter 32 are part of a single controller 34. According to an alternative embodiment, more than one controller may be used for providing the feedback controller 26, switching controller 28, and filter 32. According to other alternative embodiments, any of a variety of computing devices may be used in the control loop 22.

Feedback controller 26 produces a control signal u(s) (preferably an analog control signal) representative of the deviation of the filtered controlled variable signal $\bar{y}(s)$ from a desired set-point SP. According to an exemplary embodiment, feedback controller 26 is of conventional design and may be a proportional integral (PI) type device, such as disclosed in U.S. Pat. No. 5,506,768 the entire contents of which are hereby incorporated by reference herein. Alternatively, the feedback controller may be a proportional integral derivative (PID) type device, or the like. (According to other alternative embodiments, digital logic could be used along with analog-to-digital and digital-to-analog converters.)

The control signal u(s) preferably has values between zero and one (i.e., between 0% and 100%) in response to the inputs to feedback controller 26. The value of control signal u(s) provides a relative indication of the magnitude (0% to 100%) that the controlled device 30 needs to be operated at in order to bring the downstream variable z(s) to the desired level or set point SP, i.e., the control signal u(s) is representative of the difference or "error" between the setpoint SP and the filtered controlled variable signal $\bar{y}(s)$.

The control signal u(s) is applied to the switching law algorithm interposed between feedback controller 26 and the driver for the controlled device 30. According to a preferred embodiment, the switching law algorithm is provided in a pulse modulation adaptive controller ("PMAC"), such as described in U.S. patent application Ser. No. 10/040,069 titled "Pulse Modulation Adaptive Control Method For Activating An Electrical Device" filed Nov. 7, 2001, which is hereby incorporated herein by reference. According to an alternative embodiment, the switching law algorithm is provided in a conventional pulse width modulation ("PWM") controller.

Figure 7:
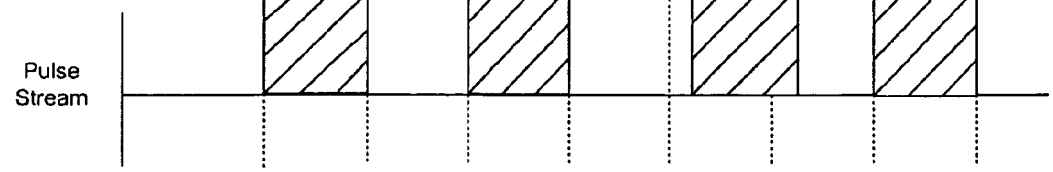

Switching controller 28 responds to the control signal u(s) by producing an output signal h(s) (i.e., a sequence, in time, of on and off epochs; which is also known as a "pulse stream" or "pulse train" and shown in FIG. 7). This output signal h(s) is the input signal to controlled device 30 and turns controlled device 30 on and off. The output signal h(s) has a cycle period and an on-time that is a fraction of the total cycle period. In a preferred embodiment, both the cycle period and the on-time are functions of the control signal u(s).

Downstream variable z(s) is comprised of a gain component 38 and a dynamic component 40 (e.g., how quickly or slowly the downstream variable z(s) responds to changes to the input, reflected as a time constant $T_D$). According to an exemplary embodiment, filter 32 provides a filtered signal representative of z(s). As such, filter 32 provides feedback controller 26 with an approximation of the dynamics of the downstream variable z(s) of the downstream system 24 being controlled.

Controlled variable y(s) has a time constant $T_C$, which is smaller (i.e., shorter) than the time constant $T_D$ of the downstream variable z(s). As such, the controlled variable y(s) may exhibit large oscillations as controlled device 30 is switched on and off, which tends to inhibit effective application of feedback control. To overcome this problem, controlled variable y(s) is passed through filter 32 which has a time constant $\tau$ representative of the dominant time constant $T_D$ of the downstream system 24. Thus, filter 32 produces a filtered controlled variable signal $\bar{y}(s)$ in response to the controlled variable y(s) input. Control loop 22 then controls the filtered controlled variable $\bar{y}(s)$ to a tolerance level related to the desired variation in the downstream variable z(s) (i.e., dynamic component 40), rather than the one actually being controlled. Also, knowing the time constant $\tau$ of the filtered controlled variable is intended to reduce potential for errors in estimating a value in switching controller 28. The potential for errors in estimating a value in switching controller 28 is reduced when the time constant $\tau$ of the filtered controlled variable is known.

According to a preferred embodiment, filter 32 is a first-order filter represented by the following transfer function:

$$G_f(s) = \frac{1}{1+\tau s} \quad (1)$$

where $G_f(s)$ is the filtered controlled variable, $\tau$ is the filter time constant, and s is the Laplace operator.

According to a preferred embodiment, controlled device 30 is implemented in discrete-time, such that filter 32 may be expressed as the following exemplary recursive equation:

$$\bar{y}_k = \exp\left(\frac{-\Delta t}{\tau}\right)\bar{y}_{k-1} + \left(1 - \exp\left(\frac{-\Delta t}{\tau}\right)\right)y_k \quad (2)$$

where $\bar{y}$ is the filtered signal, y is the measured signal, $\Delta t$ is the sampling interval, $\tau$ is the filter time constant, and k is a sample number. As such, $y_K$ is the measured controlled signal and $\bar{y}_{K-1}$ is the previous filtered controlled signal. Also, $\Delta t$ is preferably set as a configuration parameter of controller 34. According to exemplary embodiments, $\Delta t$ is measured in seconds, minutes, or the like. As such, the exponential function for the previous filtered signal exp $$\left(\frac{-\Delta t}{\tau}\right)\bar{y}_{k-1}$$

is a constant. The first-order filter 32 is applied to the faster reacting controlled variable using a time constant $\tau$ that is representative of the dominant time constant associated with the slower-reacting variable (i.e., the time constant $T_D(s)$ of the downstream variable z(s)). The filtered variable $\bar{y}(s)$ may then be controlled directly.

According to an exemplary embodiment, $G_s(s)$ is representative of controlled device 30 and has a smaller dominant time constant than $G_d(s)$—which is representative of the dynamic component of downstream system 24—and $G_f(s)$ is representative of the first order filter 32. The dynamic component, $G_d(s)$ may be higher than first order, but using a first order filter is sufficient to synchronize the controlled device with the dynamic component of the downstream system. FIG. 2 illustrates the concept using transfer function blocks, where:

$$G_f(s) \approx G_d(s) \quad (3)$$

Accordingly, the controlled variable signal y(s) is filtered through first-order filter 32 using a time constant $\tau$ representative of the dominate time constant associated with the slower-reacting downstream variable z(s).

Figure 3:
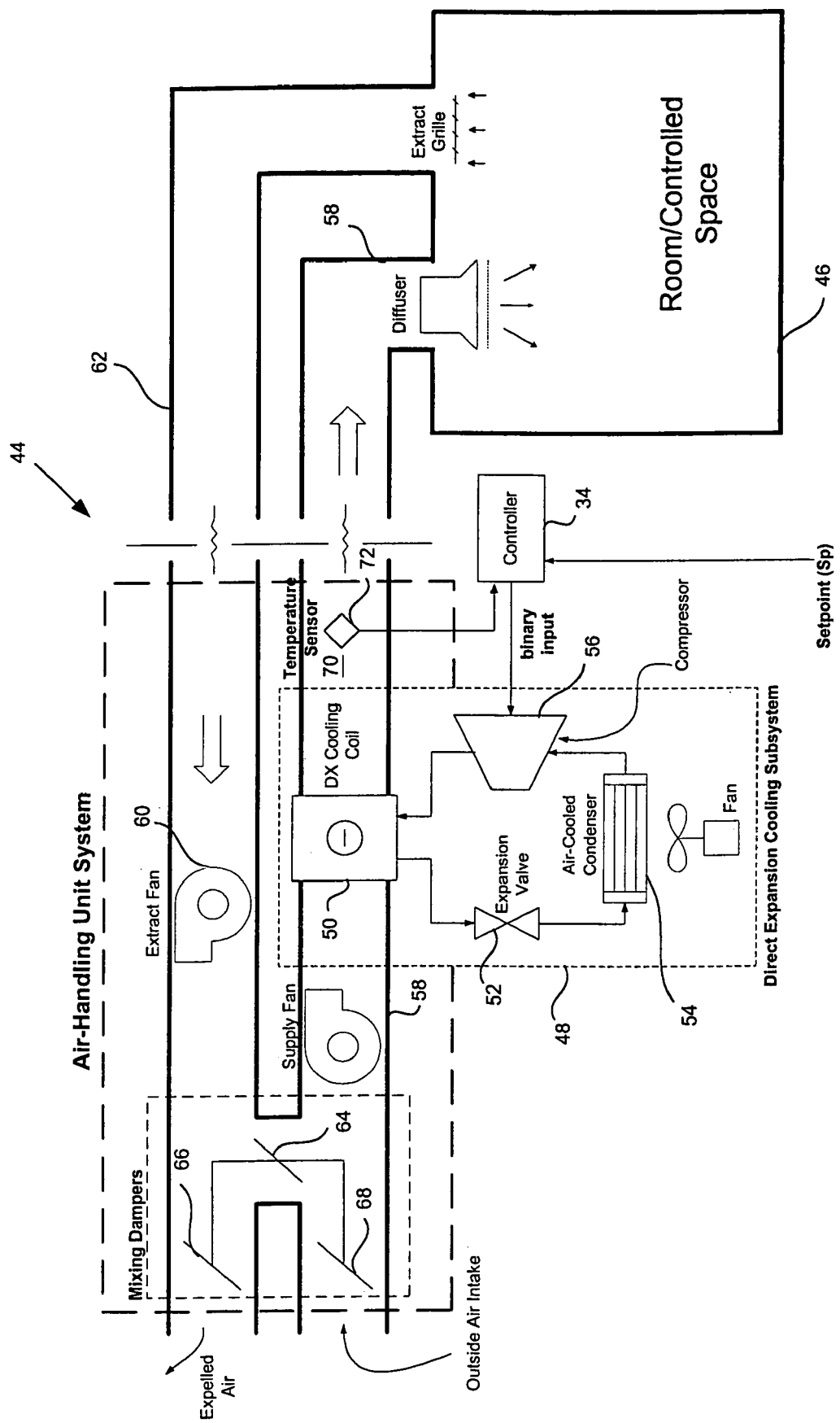
FIG. 3 is a schematic diagram of an air-handling system that utilizes the control system according to an exemplary embodiment.

FIG. 3 illustrates an air-handling system 44 (e.g., an HVAC system) for controlling the environment of a controlled space or target zone 46. According to an exemplary embodiment, controlled space 46 comprises several rooms each of which receive air supplied by air handling system 44. Controlled space 46 may be any number of one or more rooms having any of a variety of configurations and may span one or more floors of a building (or be an entire building).

Air-handling system 44 includes a cooling subsystem 48 configured to remove heat from air being supplied to controlled space 46. A fluid circulates through a direct expansion cooling coil 50, then flows through an expansion valve 52 to a condenser coil 54 (e.g., outside the building) and through one or more compressors 56 before being returned to cooling coil 50. (Alternatively, air-handling system 44 may include a heating subsystem wherein a heating coil selectively receives heated water from a boiler when the room environment needs to be warmed.) Air in a supply duct 58 flows through cooling coil 50 before being fed into the controlled space 46. Air from the controlled space 46 is drawn by a fan 60 into a return duct 62 from which some of the air flows through a damper 64 and past cooling coil 50 to the supply duct 58. Some of the return air may be exhausted to the outside of the building through an outlet damper 66 and replenished by fresh outside air entering through an inlet damper 68. The dampers 64, 66, 68 may be opened and closed by actuators that are operated by a control loop such as well known to those skilled in the art.

Referring to FIGS. 2 and 3, the downstream variable z(s) relates to the temperature of the air in controlled space 46, and the controlled variable y(s) relates to the temperature of the air coming off the cooling coil 50 (the "supply air" 70). According to a preferred embodiment, controller 34 includes feedback controller 26, the switching law algorithm, and filter 32. According to an alternative embodiment, more than one controller may be used to provide the feedback controller, switching controller, and the first order filter. According to other alternative embodiments, any of a variety of computing devices may be used in the control loop 22.

A temperature sensor 72 measures the temperature of the supply air 70 so that this information is available to control loop 22.

Controller 34 for air-handling system 44 is configured to determine when and how many compressors 56 to run to meet the present thermal loading demands. According to an exemplary embodiment, each compressor 56 has two operational states: on and off. Depending upon the amount of cooling required to bring the temperature of supply air 70 to the desired set-point (SP) temperature, controller 34 may activate one or more compressors 56. If controller 34 detects that the temperature of supply air 70 needs to be adjusted, it switches one or more of the heating or cooling devices on or off. (Each cooling device when turned on always runs at full capacity, regardless of the degree to which the room temperature varies from the desired level).

According to an exemplary embodiment, controller 34 of air-handling system 44 controls one or more compressors 56 to run at full capacity (i.e., the compressors are left on), while another compressor is cycled on and off to meet the fractional cooling requirements. In another embodiment, the compressor that is cycled on and off is switched based on the PMAC algorithm described in U.S. patent application Ser. No. 10/040,069 and previously incorporated by reference herein. Alternatively, compressor 56 may be switched in accordance with a conventional pulse width modulation (PWM) algorithm. (The PMAC technique differs from prior PWM control methods in that both the on-time of the device and the cycle period are dynamically varied to meet the load demand of the system.)

As the number of compressors 56 running at any given time changes in response to the control signals from controller 34, the temperature of supply air 70 will oscillate in accordance with those changes.

In the air-handling system 44, the controlled variable y(s) is the actual measured value of an environmental characteristic or parameter of the air handling system 44 (e.g., the temperature of supply air 70 coming off the cooling coil(s) 50, as measured by the temperature sensor 72) and the set-point SP designates the desired supply air temperature.

According to an exemplary embodiment, the time constant of the air temperature in controlled space 46 is based on expected values for typical HVAC systems. By way of example and not limitation, a typical time constant for a controlled space of an HVAC system may be between about 20 and about 40 minutes. According to a typical embodiment, therefore, the time constant of the air temperature in controlled space 46 is about 30 minutes. According to alternative embodiments, the time constant for the downstream variable z(s) may be any of a variety of values or ranges, depending on the size and configuration of the controlled space 46, the capacity of the air-handling system 44, etc. Alternatively, the time constant of the air temperature in the controlled space 46 (i.e., the downstream variable z(s)) may be determined using any of a variety of empirical or analytical techniques (e.g., empirically determined by varying the supply air temperature and timing how long it takes for the temperature in the controlled space 46 to reach 63% of the steady state temperature).

Figure 4:
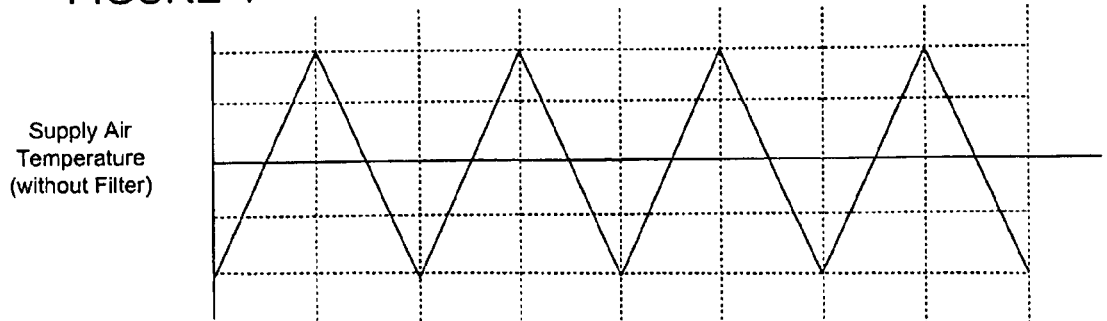
FIGS. 4–7 graphically illustrates parameters and signals in connection with the control system and method.
Figure 5:
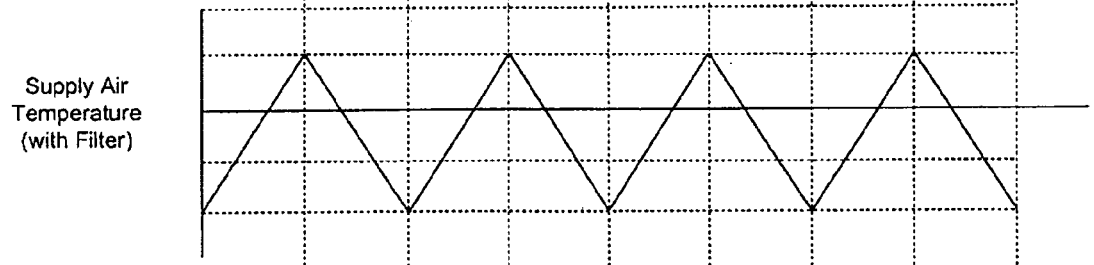
Figure 6:
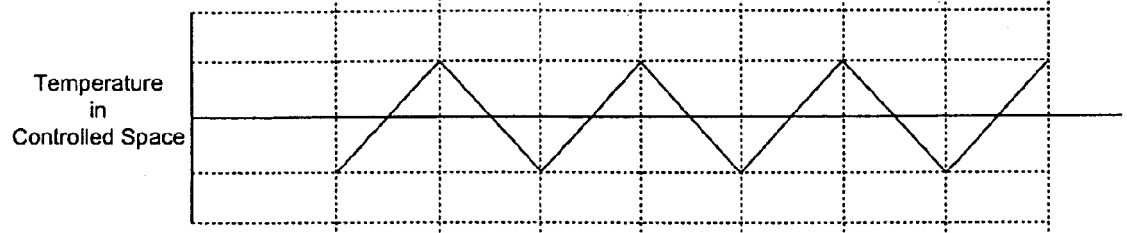

As shown in FIGS. 4–6, by applying such a filter to the controlled variable, the amplitude of the oscillations are reduced. FIG. 4 shows the measurement of a supply air temperature 70 provided by a typical prior art HVAC to a downstream controlled space, while FIG. 6 shows the actual measured temperature in the controlled space. As typical for such prior art HVAC systems, the amplitude of the oscillations of the supply air temperature is significantly greater than the amplitude of oscillations of the temperature in the controlled space. Referring to FIGS. 5 and 6, by using a filter such as described above, the supply air temperature (FIG. 5) can be controlled to have oscillations of approximately the same magnitude as the oscillations in the controlled space (FIG. 6). As persons skilled in the art will appreciate, this can significantly improve the efficiency of operation of the system.

FIGS. 1–7 show a method and system for controlling an environmental management system (e.g., an HVAC system) that controls an environmental parameter of a downstream controlled space (e.g., the temperature of a room in a building). The method includes providing a feedback control loop for controlling an environmental parameter (e.g., the supply air temperature), and generating a feedback control signal based on the controlled parameter and a dynamic (e.g., a time constant) of the downstream controlled space. The system includes a device for receiving a signal representative of a measured value of a controlled parameter having a time constant that is smaller than the time constant of the downstream space. The system also comprises a filter, a device for producing a control signal representative of a deviation between a filtered value and a desired value of the controlled parameter, and a device for converting the control signal into a pulsed output signal that turns the device on and off.

According to an exemplary embodiment, a method for controlling a discrete system that affects a target parameter of a target zone comprises providing a feedback control loop for controlling a controlled parameter of the discrete system. The method further comprises generating a feedback signal based upon the controlled parameter and a dynamic representative of the target zone. The discrete system may be an environmental management system, in which case the controlled environmental parameter may be the temperature of air supplied to the target zone (e.g., one or more rooms in the building that receive the conditioned air). The step of generating the feedback signal may include passing a measured value for the controlled parameter through a filter, such as a first-order filter with a time constant based on the dynamic component of the target zone.

According to another exemplary embodiment, a system for controlling a discrete device that affects a parameter of a target zone having a first time constant comprises means for receiving a signal representative of a measured value of a controlled parameter having a second time constant. The second time constant is smaller than the first time constant. The system also comprises means for passing the measured value through a filter using a third time constant to provide a filtered value. The system further comprises means for producing a control signal representative of a deviation between the filtered value and a desired value of the controlled parameter, and means for converting the control signal into a pulsed output signal that turns the device on and off.

Referring to FIGS. 8 and 9, a system and method for controlling a discrete system is shown according to another preferred embodiment.

FIG. 8 shows a filtered variable feedback control loop system 120 including a feedback control loop 122 and a downstream (controlled) system 124. Control loop 122 is configured to apply a value averaging (e.g., filter) to a controlled parameter or variable y(s).

Control loop 122 includes a feedback controller 126, a switching law (shown as a switching controller 128 that operates from a switching law algorithm), a controlled system (shown as a controlled device 130), and an averaging device 132. As explained in detail below, averaging device 132 is applied to controlled variable y(s) so that controlled device 130 is sufficiently dampened to enable effective feedback control. According to a preferred embodiment, feedback controller 126, switching controller 128, and averaging device 132 are part of a single controller 134. According to an alternative embodiment, more than one controller may be used for providing the feedback controller 126, switching controller 128, and averaging device 132. According to other alternative embodiments, any of a variety of computing devices may be used in the control loop 122.

Feedback controller 126 produces a control signal u(s) representative of the deviation of the averaged or filtered controlled variable signal $\bar{y}(s)$ from a desired set-point SP. According to an exemplary embodiment, feedback controller 126 is of conventional design and may be a proportional integral (PI) type device, such as disclosed in U.S. Pat. No. 5,506,768 the entire contents of which are hereby incorporated by reference herein. Alternatively, the feedback controller may be a proportional integral derivative (PID) type device, or the like. (According to other alternative embodiments, digital logic could be used along with analog-to-digital and digital-to-analog converters.)

The control signal u(s) preferably has values between zero and one (i.e., between 0% and 100%) in response to the inputs to feedback controller 126. The value of control signal u(s) provides a relative indication of the magnitude (0% to 100%) that the controlled device 130 needs to be operated at in order to bring the downstream variable z(s) to the desired level or set point SP, i.e., the control signal u(s) is representative of the difference or "error" between the setpoint SP and the averaged or filtered controlled variable signal $\bar{y}(s)$.

The control signal u(s) is applied to the switching law algorithm interposed between feedback controller 126 and the driver for the controlled device 130. According to a preferred embodiment, the switching law algorithm is provided in a pulse modulation adaptive controller ("PMAC"), such as described in U.S. patent application Ser. No. 10/040,069 titled "Pulse Modulation Adaptive Control Method For Activating An Electrical Device" filed Nov. 7, 2001, which is hereby incorporated herein by reference. According to an alternative embodiment, the switching law algorithm is provided in a conventional pulse width modulation ("PWM") controller.

Switching controller 128 responds to the control signal u(s) by producing an output signal h(s) (i.e., a sequence, in time, of on and off epochs; which is also known as a "pulse stream" or "pulse train" and shown in FIG. 7). This output signal h(s) is the input signal to controlled device 130 and turns controlled device 130 on and off. The output signal h(s) has a cycle period and an on-time that is a fraction of the total cycle period. In a preferred embodiment, both the cycle period and the on-time are functions of the control signal u(s).

When controlled variable y(s) has a time constant $T_C$, that is small relative to minimum on/off times of the controlled device 130, the controlled variable y(s) may exhibit large oscillations as the controlled device 130 is switched on and off, which tends to inhibit effective application of feedback control. To overcome this problem, controlled variable y(s) is passed through an averaging device 132 that has a time constant τ based on certain specifications of the controlled device (e.g. as provided by the manufacturer). Thus, averaging device 132 produces an averaged or filtered controlled variable signal $\bar{y}(s)$ in response to the controlled variable y(s) input. Control loop 122 then controls the averaged or filtered controlled variable $\bar{y}(s)$ to a tolerance level related to the specified operational or performance characteristic, rather than the one actually being controlled.

According to an exemplary embodiment, the controlled device 130 has a plurality of operational states. According to an exemplary embodiment, the specified operational characteristic comprises a minimum amount of time that the controlled device operates before it can be switched between the first operational state and the second operational state. For example, one operational state comprises the controlled device 130 in an "on-condition" and the another operational state comprises the controlled device 130 in an "off-condition." Alternatively, the controlled device 130 may have any of a variety of operational states (e.g., on, off, on high, on medium, on low, etc.).

The system and method is intended to use a switching control on the controlled device 130 (particularly a controlled device with specified operational or performance characteristics such as minimum on/off times large relative to the time constant of the system trying to be controlled). The system and method shown in FIGS. 8 and 9 uses (e.g., selects, identifies, calculates, sets, etc.) a time constant ($\tau_{desired}$) independent of the downstream variable. The downstream variable z(s) of downstream system 124 is comprised of a gain component 138 and a dynamic component 140.

According to an exemplary embodiment, minimum on/off times of the controlled device 130 are compared to the time constant ($\tau_{device}$) of the controlled device 130 so that if the minimum on/off times are sufficiently large (relative to the time constant), the time constant for the averaging device 132 (e.g., a filter) is a function of the minimum on/off times. As such, the time constant for the averaging device 132 is based on the minimum on/off times of the controlled device 130 rather than a downstream or other variable. With this time constant, the averaging device 132 provides an estimate of the average output of the controlled device 130.

According to an exemplary embodiment shown in FIG. 8, the switching control is generated from a series of pulses (e.g., a pulse sequence or train). Alternatively, the controller may be pulse width modulated, pulse amplitude modulation, or any of a variety of on/off sequences, or the like. The pulse modulation or sequence is applied to the controlled device 130, such as a DX coil in an HVAC system. If the dynamics of the controlled device 130 are fast (e.g., approaches steady state) relative to the amount of time needed to wait before the on/off state can be switched again, the response of the controlled device (e.g., DX coil) may resemble the pulse sequence (e.g., fluctuations between the maximum range of the DX coil and the steady state).

Generally the controlled device 130 will have minimum times that are to be allowed to pass before its state can be switched. For example, a DX coil may be required to remain on or off for several minutes after it had been switched to that on or off position before it is recommended that it can be switched to another position (e.g., off or on as the case may be) (e.g., for safety reasons, for equipment operation reasons, etc.).

The minimum on or off times are typically provided by the manufacturer of the controlled device 130 (e.g., in the manufacturers product sheet or technical data sheet, specification, owner's manual, installation manual, or the like). Alternatively, these parameters are calculated, estimated, measured or the like.

According to exemplary embodiments, the averaging device 132 may be any of a variety of processes or devices (e.g., filter (such as a first order filer, second order filter, nth order filter, etc.)), exponentially weighted average (EWMA), moving average, windowings. According to a preferred embodiment, the averaging device 132 or the averaging method comprises a filter. According to a particularly preferred embodiment, the filter is a first order filter configured to provide a moving average based on an exponential profile that weights "older" samples less than "newer" or more recent samples.

According to an exemplary embodiment, the controlled device 130 is a DX coil and the switching controller 128 is a PMAC controller such that the time constant of the discharge air temperature from a DX coil may be between about 30 seconds and about 240 seconds, but the minimum on and off times may be up to about 5 minutes each on/off state. In a particular exemplary embodiment where τ is 30 seconds and the minimum on and off times are both 300 seconds, the average affect of the cycling discharge temperature on the zone temperature is typically more pertinent than the discharge temperature itself. (Similarly, the temperature of water leaving a cooling tower is less pertinent than the average cooling capacity it provides to the condenser.) In both of these particular examples, the average value of the fast reacting variable is more pertinent than its short term range. As such, the system and method is intended to provide an estimate of the average signal value so that this estimate may be used by PMAC to improve performance. According to exemplary embodiments, the output of the controlled device may be temperature, flow rate, static pressure, or any of a variety of characteristics under control by a switched controlled or a pulse train or sequence.

According to a preferred embodiment, the control range is improved by increasing time constant for the averaging device 130 (e.g., the filter) by estimating the average of a periodic signal by passing the signal through the averaging device (preferably a first order filter), which yields an exponentially weighted average (EWMA). The EWMA signal will typically have a longer time constant associated with it than the original signal.

The controllable range ("r") may be represented by:

$$r = \bar{y}_{u=1} - \bar{y}_{u=0} \quad (4)$$
$$= 1 - \frac{1}{C_{max}}(T_{min,on} + T_{min,off})$$
$$\bar{y}_{u=0} = \frac{T_{min,off}}{C_{max}}$$
$$\bar{y}_{u=1} = \frac{C_{max} - T_{min,on}}{C_{max}} = 1 - \frac{T_{min,on}}{C_{max}} \quad (5)$$

According to a preferred embodiment, the controllable range is selected to be 0.95 or 95 percent (%). Setting the set point of the controllable range to 95 percent for the controlled device 130, the smallest time constant required can be calculated from:

$$0.95 = 1 - \frac{1}{-\tau\ln(\delta)}(T_{min,on} + T_{min,off});$$

which leads to $$\tau = \frac{-20}{\ln\delta}(T_{min,on} + T_{min,off}) = 1.0857 \times (T_{min,on} + T_{min,off}) \quad (6)$$

According to alternative embodiments, the controllable range may be set to any of a variety of values (e.g., 50 percent, 75 percent; 80 percent; 90 percent, etc.). For example, if the time constant is 30 seconds, the cycling period is effectively 600 seconds, and r is zero; if the time constant is 651.4 seconds, r will be 95 percent. As such, the user could set the setpoint to anywhere between 2.5 percent and 95 percent of the controllable range and a PMAC or other controller could pulse the switched (controlled) device so the average value of the system output is at the set point. Use of equation (6) is preferred because although increasing the time constant for the averaging device may improve the estimation of the average, it may slow the response of the system.

The time constant calculated using the equation (6) is the minimum total time constant (the sum of the time constant of the system and the time constant of a possible averaging device 132 (e.g., the filter)) required to achieve 95% control range. The actual total time constant, therefore, should be the larger one of the result of equation (6) and the system time constant. The time constant of the averaging device 132 may then be calculated as the total time constant minus the time constant of the controlled device 130, or 0 (meaning no need for such filter), whichever is larger. As such, the method is able to not only compute the value of required total time constant for a specified control range, but also determine whether or not a filter or other averaging device is necessary.

It is also important to note that the construction and arrangement of the elements of the filtered variable control method for activating an electrical device as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, while the components of the disclosed embodiments are illustrated to be designed for an air-handling or HVAC system, the features of the disclosed embodiments have a much wider applicability. For example, the control method is adaptable for home, a workplace, or other institutional, public, government, educational, commercial, or municipal facility and the like. Further, the control method is adaptable for other controlled environments, such as heat, humidity, pressure, filtering, airflow, and the like. Further, the control method is adaptable for controlling water levels, water flow, chemical processing, and the like. Further, the filter could be implemented through hardware. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A method for controlling a controlled parameter that affects a target parameter of a target zone, the method comprising:

providing a feedback control loop having a switching controller, a controlled device, and an averaging device, the controlled device having a time constant and a specified operational characteristic, the controlled device having a first operational state and a second operational state;

calculating a time constant for the averaging device based at least on the time constant for the controlled device, and the specified operational characteristic.

2. The method of claim 1 wherein the specified operational characteristic comprises a minimum amount of time that the controlled device operates before it can be switched between the first operational state and the second operational state.

3. The method of claim 2 wherein the first operational state comprises the controlled device in an on-condition and the second operational state comprises the controlled device in an off-condition.

4. The method of claim 1 wherein the controlled device comprises a plurality of discrete operating states.

5. The method of claim 1 wherein calculating the time constant for the averaging device comprises calculating a total time constant and then subtracting the time constant for the controlled device.

6. The method of claim 1 wherein the averaging device comprises a filter.

7. The method of claim 6 wherein the filter is a first order filter.

8. The method of claim 1 further comprising producing a pulsed output signal for turning the controlled device on and off, the output signal being based on the feedback signal and a desired level for the controlled parameter.

9. The method of claim 8 wherein the system is an environmental management system and the controlled device is a compressor.

10. The method of claim 9 wherein the controlled device is an environmental management system and the controlled parameter is a temperature of supply air coming off of a cooling element.

11. The method of claim 1 wherein the target zone comprises one or more rooms in a building.

12. The method of claim 1 wherein the feedback control system is an environmental management system, a controlled parameter is a temperature of air exiting a DX coil, and a target parameter is the temperature in the target zone.

13. The method of claim 1 wherein the step of calculating the time constant for the averaging device is also based on a specified controllable range of the controlled device.

14. The method of claim 13 wherein the controllable range is about 95 percent.

15. A system for controlling a controlled parameter that affects a target parameter of a target zone, the system comprising:

a feedback control loop having a switching controller, a controlled device, and an averaging device;

wherein the controlled device includes a time constant and a specified operational characteristic, wherein the controlled device includes a first operational state and a second operational state;

wherein the averaging device includes a time constant based on the time constant for the controlled device, a controllable range of the controlled device, and the specified operational characteristic.

16. The system of claim 15 wherein the specified operational characteristic comprises a minimum amount of time that the controlled device operates before it can be switched between the first operational state and the second operational state.

17. The system of claim 16 wherein the first operational state comprises the controlled device in an on-condition and the second operational state comprises the controlled device in an off-condition.

18. The system of claim 15 wherein the averaging device comprises a filter.

19. The system of claim 18 wherein the filter is a first order filter.

20. The system of claim 15 wherein the controlled device is an environmental management system and the controlled device is a compressor.

21. The system of claim 15 wherein the controlled device is an environmental management system and the controlled parameter is a temperature of supply air coming off of a cooling element.

22. The system of claim 15 wherein the target zone comprises one or more rooms in a building.

23. The system of claim 15 wherein the feedback control system is an environmental management system, a controlled parameter is a temperature of air exiting a DX coil, and a target parameter is the temperature in the target zone.

24. A system for controlling a controlled parameter that affects a target parameter of a target zone, the system comprising:

a feedback control loop including:

a switching controller;

a controlled device having a time constant, a specified operational characteristic, a controllable range of the controlled device a first operational state, and a second operational state; and means for averaging a signal with a time constant based on the time constant for the controlled device, the controllable range of the controlled device, and the specified operational characteristic.

25. The system of claim 24 wherein the means for averaging a signal comprises an averaging device.

26. The system of claim 25 wherein the averaging device comprises a filter.

27. The system of claim 26 wherein the filter comprises a first order filter.

28. A method for controlling a device having discrete operating states that affect a parameter of a target zone having a first time constant, the method comprising:

receiving a signal representative of a measured value of a controlled parameter of the device, the controlled parameter having a second time constant that is smaller than the first time constant;

passing the measured value through an averaging device using a third time constant to provide an averaged value;

producing a control signal representative of a deviation between the averaged value and a desired value of the controlled parameter;

converting the control signal into a pulsed output signal that turns the device on and off.

29. The method of claim 28 wherein the device is a compressor of an air handling unit and the controlled parameter is a temperature of air coming off an expansion coil coupled to the compressor.

30. The method of claim 28 wherein the averaging device is a filter.

31. The method of claim 30 wherein the filter is a first order filter.

32. The method of claim 28 wherein the third time constant is an approximation of the first time constant.

33. The method of claim 28 wherein the control signal is an analog signal and converting the control signal includes applying a pulse width modulation control scheme.

34. The method of claim 28 wherein the target zone comprises one or more rooms in a building.

35. The method of claim 28 wherein the device is part of an environmental control system for a facility.

* * * * *